W. BRASACK.
AUTOMATIC BRAKE FOR CONVEYERS.
APPLICATION FILED NOV. 9, 1915.
1,187,247.
Patented June 13, 1916.
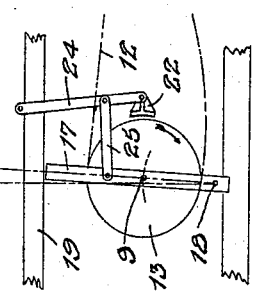
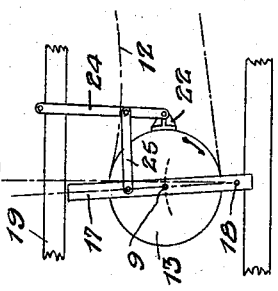
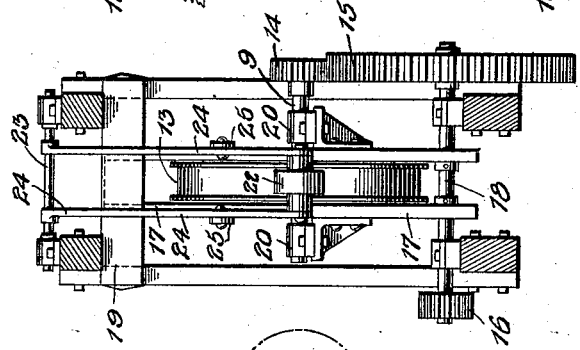
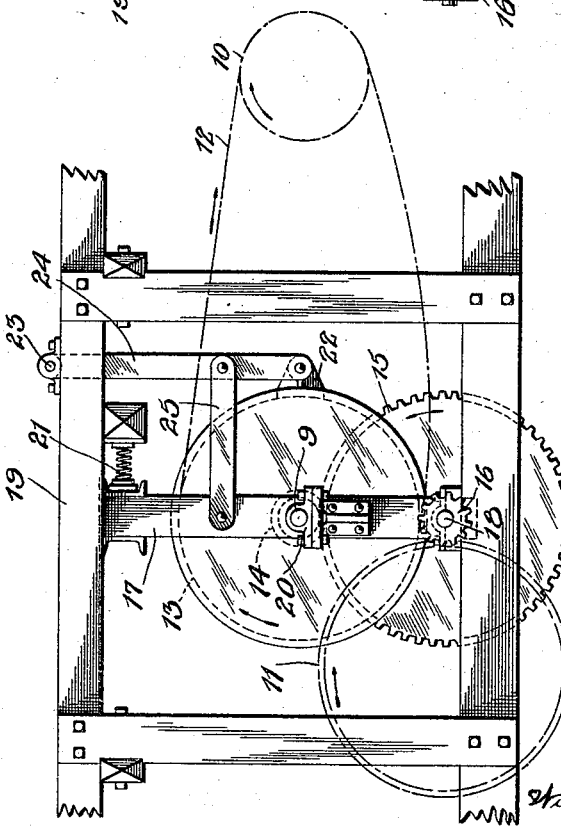
Inventor
William Brasack,
By
Knight Bros Attorneys.

UNITED STATES PATENT OFFICE.

WILLIAM BRASACK, OF FAIRMONT, WEST VIRGINIA, ASSIGNOR TO FAIRMONT MINING MACHINERY COMPANY, OF FAIRMONT, WEST VIRGINIA, A CORPORATION OF WEST VIRGINIA.

AUTOMATIC BRAKE FOR CONVEYERS.

1,187,247.  Specification of Letters Patent.  Patented June 13, 1916.

Application filed November 9, 1915. Serial No. 60,581.

*To all whom it may concern:*

Be it known that I, WILLIAM BRASACK a citizen of Germany, residing at Fairmont, in the county of Marion, State of West Virginia, have invented certain new and useful Improvements in Automatic Brakes for Conveyers, of which the following is a specification.

The present invention relates to automatically acting brakes for conveyers in which the speed fluctuates in accordance with the load carried. For instance, if a motor is applied for running the conveyer empty, or with a normal load at a uniform speed and a load above the normal has a tendency to increase the speed, then my brake will act automatically, absorbing the excess of power and thus restore the speed to normal.

In the accompanying drawing, one embodiment of the invention has been illustrated.

Figure 1 shows a side view of the automatic brake; Fig. 2, an end view seen from the right of Fig. 1; Fig. 3, a diagrammatic view of the brake out of action and Fig. 4, a similar view of the brake in action.

The driving element, such as an electric motor, steam engine or simple hand power, directly turns a pulley 10 between which and the spur gear 11 for the driven element, suitable gearing is inserted. On the main shaft 9 is rigidly secured a combined pulley and brake disk 13 over which and pulley 10 an endless chain or belt 12 runs. This belt is given a slight slackness. Obviously the brake disk and the pulley on shaft 9 need not be combined into one body, but may constitute separate members, both attached to the main shaft 9. A pinion 14 is also provided on the main shaft and meshes with a spur gear 15, which, together with a pinion 16, completes the train of gears to the spur gear 11 for moving the driven element. Gear wheels 15 and 16 are both mounted on a countershaft 18, which runs in stationary bearings on the frame 19.

Supported on the counter-shaft 18 are two uprights 17 constituting a mounting for the main shaft bearings 20. The upper end of the uprights is free to move slightly with the axis of shaft 18 as fulcrum, so that the main shaft 9 may be oscillated around the counter-shaft 18. A spring 21 tends to keep the uprights in their perpendicular or central position, as seen in Fig. 1.

A brake shoe 22 is suspended from a journal 23 on a pair of rods 24, so that it is able to swing back and forth relatively to the brake disk 13. When at rest, the rods 24 hang perpendicular, as in Fig. 1, so that shoe 22 touches or almost touches the brake disk. By means of connecting bars 25 the position of the brake shoe 22 is made to depend on the position of the uprights 17, so that if the latter are swung to the right, the shoe 22 also swings to the right into the position shown in Fig. 3, releasing the brake, and if the uprights swing to the left, the brake shoe will follow, gripping the brake disk 13 firmly as seen in Fig. 4.

Supposing now that the motor transmits power to the driven element to run it at a normal speed when empty or carrying a normal load, the pulleys, belt and gears running in the direction of the arrows, then the upper part of the belt will be taut and the lower one slack.

In transmitting the power from the pinion 14 to the spur gear 15, the pinion will experience a resistance and on account of the fact, that its bearings are mounted to swing around the axis of shaft 18, the pinion will roll toward the right on top of the spur gear 15. As a consequence, the brake shoe 22 will be pushed away from the brake disk and out of action as shown in Fig. 3. If, on the other hand, there should be an overload on the driven element, or, in other words, the latter tried to run away, then power would be transmitted in the direction from the driven element to the motor, but still in the same directions as the arrows. Then, however, spur gear 15 would be the driver and pinion 14 the driven gear. But this time the spur gear 15 will experience a resistance in transmitting power to the pinion 14, with the consequence that the latter for a moment swings to the left without revolving relatively to the spur gear 15, swinging the uprights and the brake shoe 22 in the same direction, as illustrated in Fig. 4, the upper side of the belt being slack and the lower one taut. The brake is now acting to resist the power transmitted from the driven element which tends to slow down the speed until normal conditions have been restored. The utility of the spring 21 only comes into play for steadying the uprights, and it supplies a means for adjusting the friction required for the proper working of the brake, but theoretically it is not necessary for the operation of the device.

Instead of the brake-shoe shown, I may use a band-brake, differential brake, or any other kind of brake which, however, is made dependent upon the swinging of the main shaft 9 as shown and described.

As illustrated in Fig. 1, the power of the spring would, in this case, be equal to the pull toward the right, resulting from the weight of the belt 12 when at rest. Obviously, if the pulley 10 is situated perpendicularly above or below the pulley 13, the spring 21 could be entirely dispensed with.

I claim:—

1. In an automatic brake, a driven element, a counter-shaft, a movable mounting for said shaft, driving connection between said shaft and the driven element, a brake member constructed to act against said shaft, means connecting said brake member with said shaft-mounting whereby the brake member will be automatically released when said shaft transmits power to said driven element, but the brake member will be applied when said driven element transmits power to said shaft.

2. In an automatic brake, a driven element, a counter-shaft, an oscillatory bearing member for the shaft, a driving element and a flexible driving connection between the driving element and said shaft, other driving connection between said shaft and the driven element, a brake member constructed to act against said shaft, means connecting said brake member with said oscillatory bearing, whereby said brake member will be automatically released when said shaft is driven by said driving element but applied when the shaft is driven by the driven element.

3. In an automatic brake, a driven element, a counter-shaft, an oscillatory bearing member for the shaft, a driving element and a flexible driving connection between the driving element and said shaft, other driving connection between said shaft and the driven element, a brake member constructed to act against said shaft, means connecting said brake member with said oscillatory bearing, whereby said brake member will be released through the coöperation of said means and said oscillatory bearing, when the bearing is tilted in one direction through the action of said driving element on said shaft; and said brake member will be applied through the coöperation of said means and said oscillatory bearing, when the bearing is tilted in the opposite direction through the action of the driven element on said shaft.

4. In an automatic brake, a driven element, a counter-shaft having secured thereon a pinion and a brake disk, an oscillatory mounting for said shaft, a spur gear meshing with said pinion for transmitting power between said pinion and the driven element, said spur gear being mounted coaxially with the fulcrum of said shaft-mounting, a brake shoe positioned for engagement with said disk, a connecting member between said shoe and said shaft-mounting, whereby said connecting member, shaft mounting, pinion and spur gear coöperate to release said brake shoe when power is being transmitted through said gears in the direction to the transmitter and the same parts coöperate to apply the brake shoe when power is being transmitted through the gears from the driven element.

5. In an automatic brake, a driven element, a counter-shaft having secured thereon a pinion and a brake disk, an oscillatory mounting for said shaft, a spur gear meshing with said pinion for transmitting power between said pinion and the driven element, said spur gear being mounted coaxially with the fulcrum of said shaft-mounting, a brake shoe positioned for engagement with said disk, a connecting member between said shoe and said shaft-mounting, a driving element having a pulley, an endless belt running over said pulley and said brake disk, whereby said belt will move said shaft mounting in one direction, thus releasing said shoe when power is being transmitted from the driving element to the driven element; and said spur gear will move said shaft mounting in the opposite direction, thus applying the brake shoe, when power is being transmitted in the direction to the driving element from the driven element.

6. In an automatic brake, a driven element, a counter-shaft, having secured thereon a spindle and a brake disk, an oscillatory mounting for said shaft, balancing means tending to hold said shaft-mounting in a central position, a spur gear meshing with said pinion for transmitting power between said pinion and the driven element, said spur gear being mounted coaxially with the fulcrum of said shaft-mounting, a brake shoe positioned for engagement with said disk, a connecting member between said shoe and said shaft-mounting, whereby said connecting member, shaft-mounting, pinion and spur gear coöperate to release said brake shoe when power is being transmitted through said gears in the direction to the transmitter and the same parts coöperate to apply the brake shoe when power is being transmitted through the gears from the driven element.

7. In an automatic brake, a driven element, a counter-shaft, having secured thereon a pinion and a brake disk, an oscillatory mounting for said shaft, a spring tending to hold said shaft-mounting in central position, a spur gear meshing with said pinion for transmitting power between said pinion and the driven element, said spur gear being mounted coaxially with the fulcrum of said shaft-mounting, a brake shoe positioned for engagement with said disk, a connecting member between said shoe and said shaft-mounting, a driving element having a pulley, an endless belt running over said pulley and said brake disk, whereby said belt will move said shaft-mounting in one direction, thus releasing said shoe when power is being transmitted from the driving element to the driven element; and said spur gear will move said shaft-mounting in the opposite direction, thus applying the brake shoe, when power is being transmitted in the direction to the driving element from the driven element.

The foregoing specification signed at Fairmont, Marion county, West Virginia, this 19th day of October, 1915.

WILLIAM BRASACK.

Copies of this patent may be obtained for five cents each, by addressing the "Commissioner of Patents, Washington, D. C."